Patented May 26, 1953

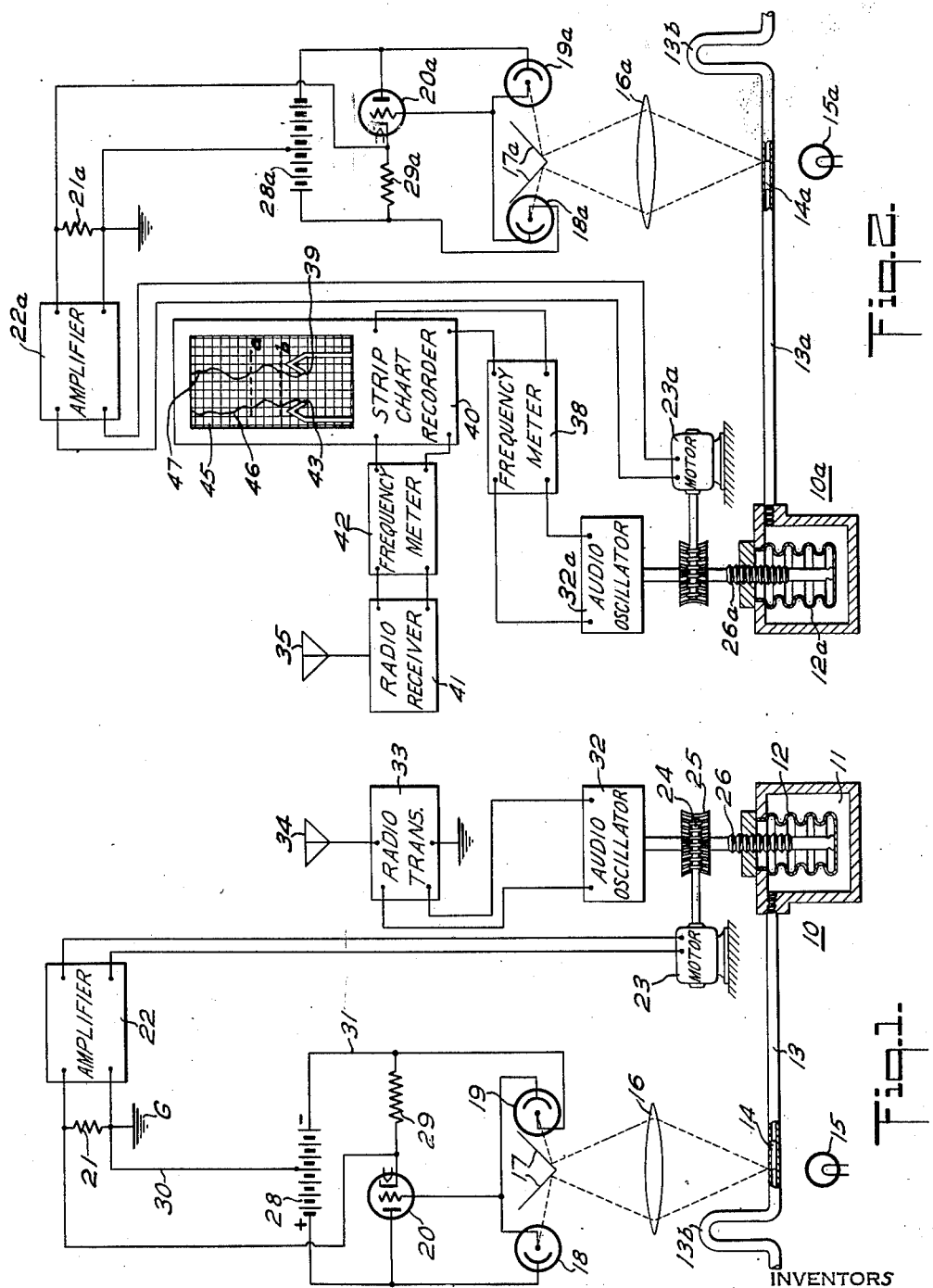

2,639,615

UNITED STATES PATENT OFFICE 2,639,615

BAROMETRIC MEASUREMENT OF ELEVATION

Dayton H. Clewell and Carl F. Rust, Dallas, Tex., assignors, by mesne assignments, to Socony-Vacuum Oil Company, Incorporated, New York, N. Y., a corporation of New York Application March 11, 1947, Serial No. 733,888

3 Claims. (Cl. 73—384)

This invention relates to apparatus for determining elevation by means of barometric pressure and has for an object the elimination of transient pressure changes which are unrelated to elevation.

It is well known that barometric pressure decreases with rise in elevation and barometers have long been utilized in order to obtain a rough measurement of elevation. It has been further recognized that the accuracy of such measurements leaves much to be desired. Nevertheless, in accordance with the present invention apparatus has been developed by means of which differences in elevation between a plurality of stations may be determined with a relatively high degree of accuracy, certainly adequate for many purposes and particularly with sufficient accuracy to be highly valuable in connection with geological surveys.

In order to utilize barometric pressure for determination of elevation, it is, of course, necessary very accurately to measure the barometric pressure. This may be done by utilizing a highly sensitive measuring instrument such as disclosed in patent application, Serial Number 655,660, filed March 20, 1946, by George E. Conover, a coworker of ours, for "Pressure Measuring Instrument."

In carrying out the present invention in one form, differences in elevation between two stations are determined by simultaneously measuring the barometric pressures at those stations. The reading of the barometric pressure at one station is then communicated to the other station. During the period of time when the barometric pressures at the two stations are varying at the same rate and in the same direction, their differences are taken and the difference in elevation determined in the usual way. With the elevation known at the first station, the absolute elevation may be readily determined at the second station. The procedure is then repeated for additional stations and in this way the elevation of a given terrain may be determined over any desired distance.

For a more detailed explanation of the invention and for further objects and advantages thereof, reference is to be had to the following description taken in conjunction with the accompanying drawing, in which there has been diagrammatically illustrated in Figure 1 the apparatus located at one station; and in Figure 2 there has been diagrammatically illustrated the apparatus located at a second station.

Though the present invention may be utilized for determination of elevation regardless of purpose, it has been found particularly useful in connection with geophysical surveys, whether in connection with a gravity survey or in connection with seismic surveys. In either case, it is desirable to have at hand a measurement of the elevation of the terrain over which the survey is conducted. In the region of any such survey, there are generally available one or more bench marks or other references by means of which the absolute elevation of one station may be determined with great accuracy. At such a station, there will then be located the apparatus illustrated in Figures 1 and 2. Normally the apparatus of Figure 1 will be located at one station while the apparatus of Figure 2 will be located at a second station a substantial distance therefrom. However, at the beginning of an elevation survey the station apparatus of Figures 1 and 2 is located at the same station in order that both may have the same initial setting.

Referring to Figure 1, there is illustrated at 10 an instrument highly sensitive to changes in barometric pressure. It has been diagrammatically shown as of the same type as that disclosed in the aforesaid Conover application, Serial No. 655,660. It consists of a sealed chamber 11 in which there is located an expansible bellows 12 which, upon elongation or contraction thereof, changes the volume and pressure within the chamber 11. The chamber 11 communicates with a transparent tube or pipe 13, preferably of glass. Glass tube 13 contains a globule 14 of a low density liquid which may be a non-volatile oil, such as butyl phthalate. The tube 13 also includes a liquid trap 13b and it is provided with an open end exposed to the atmosphere. Suitable valves, not shown, may be included to seal the instrument 10 during transport from one station to another. The tube 13 may have a scale inscribed along a surface thereof although such a scale is not essential.

As shown, a light source 15 is arranged to direct a light beam on the globule 14. The light which misses the globule 14 is focussed by a lens 16 onto angular mirrors 17 which reflect the light into a pair of photoelectric cells 18 and 19. When the globule or bubble 14 is at a predetermined or null position it is intended that the light beam directed by the lens 16 shall be equally divided between the photoelectric cells 18 and 19. Since these cells are connected in series, the voltage applied to the grid of the amplifier tube 20 is equal to the midpoint voltage of the battery 28. This input circuit is of the cathode follower type where resistor 29 is the cathode biasing resistor. Hence the cathode of the tube 20 is at the same potential as the grid and the voltage across the resistor 21 is zero. However, as the globule 14 moves, the division of the light between the two photoelectric cells will change, thereby changing the grid and cathode potentials and developing a resultant voltage across the resistor 21. This output signal is then amplified by an amplifier 22 and applied to a motor 23 to produce rotation through the worm 24 and wheel 25 of a threaded plunger 26 which changes the setting of the bellows 12 in a direction to counterbalance the change in pressure which caused the initial movement of the globule 14.

The amplifier circuit, including the tube 20, is of the cathode-follower type and includes a B battery 28 and a cathode-biasing resistor 29. The resistor 29 preferably has a relatively high resistance, of the order of 30,000 ohms as compared with the resistance of the resistor 21 which may be of the order of 1,000 ohms. This means that there will be developed a relatively high negative feedback so that the cathode potential will at all times closely approximate the potential of the grid. However, it is to be understood that the resistor 21 may be omitted, if desired.

When the motor 23 adjusts the bellows 12, it simultaneously adjusts the frequency of an audio oscillator 32 which is connected to a radio transmitter 33 for transmission of the audio frequency by means of an antenna 34 to a receiving antenna 35 of the apparatus generally located at a second observing station.

As shown in Fig. 2, the system as a whole is substantially identical with the system of Figure 1, there being provided the sensitive barometric measuring instrument 10a provided with a tube 13a enclosing a globule or bubble 14a and having a liquid trap 13b. As in Figure 1, a light source 15a directs light through a lens 16a onto a reflecting mirror 17a for reflection to photoelectric cells 18a and 19a. A vacuum tube 20a is provided with a cathode resistor 29a and with an output resistor 21a as well as with a B battery 28a. The filament supply, omitted in both Figures 1 and 2, may be of conventional type. Adjustment by the motor 23a of the bellows 12a simultaneously changes the frequency of an audio oscillator 32a. However, the output of the audio oscillator 32a is applied to a frequency meter 38, the output of which is arranged to control the position of a stylus 39 of a strip-chart recorder 40. Similarly, the output from a radio receiver 41 is applied to a frequency meter 42, the output of which is arranged to control the position of a stylus 43 of the recorder 40.

At the initial or calibrating station, where it was assumed the systems of Figures 1 and 2 were initially located, both instruments are adjusted for production by the audio oscillators 32 and 32a of identical frequencies. This adjustment takes place automatically since both instruments are then subject to the same atmospheric or barometric pressure and the respective motors 23 and 23a will necessarily adjust the Sylphon bellows 12 and 12a to produce the same pressures within the tubular members 13 and 13a. Of course, if the instruments 10 and 10a do not have the same initial calibrations, the audio frequencies for a given barometric pressure will not be identical. Account will then be taken as to the difference in the calibration or correction made in the initial adjustment of one instrument or the other. The record chart is preferably calibrated in terms of pressure for direct reading.

The system of Figure 2 will then be moved to a second station which may be any desired distance from the first station. Upon arrival, the atmospheric pressure will then be determined in manner already described. The atmospheric pressure will be simultaneously measured at the first station and the magnitude thereof transmitted in terms of frequency to the antenna 35 and the radio receiver 41 of the second station. The frequency meter 42 at the second station will convert the received signals into a deflection on the stylus 43 in terms of the magnitude of the barometric pressure at the first station. Simultaneously, the oscillator 32a and the frequency meter 38 will convert the barometric pressure at the second station into deflections on the stylus 39 in terms of magnitude of the barometric pressure at the second station.

As illustrated on the record chart 45, during the time interval above broken line a, the barometric pressure curve 46 of the first station varied at a substantially differing rate from that as shown by the curve 47 for the pressure at the second station. However, during the time interval indicated between the broken lines a and b, the pressures at both stations were varying at the same rate and in the same direction. Accordingly, during the time interval between a and b, or on the chart between the lines a and b, the difference in the barometric pressure is taken and from it the difference in elevation is readily calculated in manner well understood by those skilled in the art.

In accordance with the invention, there has been avoided those transient changes which appear to be present at substantially all times and which, if not eliminated, would greatly and adversely affect the accuracy of the measurements in terms of elevation. Thus, for example, during the time interval just preceding the broken line a, the pressures at the two stations were varying in opposite directions and at different rates. If differences were taken during that time interval, the determination of elevation would be inaccurate to an intolerable degree. However, in accordance with the present invention, the barometric pressures at the two stations are utilized for elevation determination during the time interval when the rates of change of the pressures are varying at the same rate and in the same direction. Accordingly, absolute elevation may be determined with an accuracy of plus or minus only a few inches.

Inasmuch as the elevation of the second station has now been determined, it is only necessary to have the field man at the first station move the apparatus of Figure 1 to the third station. The foregoing procedure is then repeated for accurate determination of the elevation of the third station. Thereafter the apparatus of Figure 2 is transported to a fourth station for determination of its elevation. The foregoing procedure may then be continued over any desired distance. If the survey is terminated at the end of one day, the two instruments at the beginning of the next day may be again brought into simultaneous adjustment at the last station of the preceding day's survey for continuation of the survey.

Now that the principles of the invention have been set forth in detail, it is to be understood that the apparatus disclosed should be taken as suggestive. More particularly, the radio transmitter 33 and the receiver 41 may be eliminated by substituting therefor a transmission line. Intead of the audio oscillators 32 and 32a and the frequency meters 38 and 42, any other means for comparing the positions of the bellows-adjusting means 26 and 26a may be utilized for actuation of the marking means 39 and 43 of the recorder 40. As a matter of fact, the principles of the invention may also be carried out by simultaneous plotting against time, at the two stations, of the readings of the two sensitive measuring instruments 10 and 10a and subsequently taking those readings for subtraction of the difference in elevation during the time intervals when the rates of change are substantially equal and in the same direction. In this connection, it is preferred that readings from one station shall be transmitted through a suitable communication channel to the other station for concurrent plotting on section paper of instrument readings, representing barometric pressure values, against time. When this is done, the operator or person plotting the data from both stations can continue to do so until the barometric pressures change at the same rates and in the same directions. When this occurs, the operator knows he has reliable data and can then signal the operator at the other station that the measurement has been concluded and it is time for one or the other to move to the next station.

It will be understood that this invention is not to be construed as limited to the particular design of the various parts and comparison equipment herein described and illustrated, but is intended to include all modifications and variations thereof which fall within the scope of the appended claims.

What is claimed is:

1. A system of determining differences in elevation between two stations by means of barometric pressure comprising barometric pressure responsive devices, at least one of said devices having adjustable means for making the reading of said one device the same as the other device to calibrate one of said devices with respect to the other when both are at the same altitude subjected to the same barometric pressure, means for transmitting barometric values between two stations spaced one from the other, and means for recording on a record chart for a time interval the barometric pressure values at both of said stations as respectively determined by said devices so that when said values at said stations over a time interval vary at substantially the same rate and in the same direction they may be subtracted to determine the elevation of one station with respect to the other unaffected by atmospheric changes in the barometric pressures at said stations.

2. A system of determining differences in elevation between two stations by means of barometric pressure comprising barometric pressure responsive devices, each including a sealed chamber and adjustable means for varying the volume of said chamber until the pressure therein equals that of the atmospheric pressure for null measurement thereof, the adjustable means of two of said devices being operable with them at the same elevation at a common location to bring one of them into calibration with respect to the other, means for transmitting barometric values between two stations spaced one from the other, and means for recording on a record chart barometric pressure values determined by said devices which have been calibrated and respectively located at each of said stations over a time interval during which the barometric pressure and the balancing pressures of said spaced stations vary at substantially the same rate and in the same direction, whereby subtraction of the pressure values at one station from the pressure values at the other station are representative of the difference in elevation between said stations.

3. A system determining differences in elevation between two stations by means of barometric pressure comprising barometric pressure responsive devices, one located at each station, one of said devices having adjustable means for making the reading of said one device the same as the other device to calibrate one of said devices with respect to the other, means for transmitting the barometric values to a common station, and means for recording said transmitted values comprising a record chart and a recording stylus representing each of said stations, said styluses being in side by side relation and cooperating with said record chart whereby the barometric values at both of said stations as respectively determined by said devices are recorded over a time interval so that when the values at said stations vary at substantially the same rate and in the same direction they may be subtracted to determine the elevation of one station with respect to the other unaffected by atmospheric changes in the barometric pressures at said stations.

DAYTON H. CLEWELL.
CARL F. RUST.

References Cited in the file of this patent

UNITED STATES PATENTS

| Number | Name | Date |
| --- | --- | --- |
| Re. 20,948 | Kollsman | Dec. 13, 1938 |
| 1,787,536 | Hayes | Jan. 6, 1931 |
| 2,008,832 | Leonard, Jr. | July 23, 1935 |
| 2,042,490 | Zahl | June 2, 1936 |
| 2,122,622 | Robinson | July 5, 1938 |